US006442993B2

(12) United States Patent
DiMora

(10) Patent No.: US 6,442,993 B2
(45) Date of Patent: Sep. 3, 2002

(54) SENSOR ALIGNMENT FOR A DOCUMENT PROCESSING APPARATUS

(75) Inventor: Scott Joseph DiMora, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/827,726

(22) Filed: Apr. 6, 2001

Related U.S. Application Data

(62) Division of application No. 09/450,490, filed on Nov. 29, 1999, now Pat. No. 6,247,347.

(51) Int. Cl.[7] .................................... G01B 21/00
(52) U.S. Cl. .................................... 73/1.79
(58) Field of Search .................... 73/1.79, 1.81, 73/866.5, 865.9; 340/686, 540, 501, 514, 517, 531, 533, 538; 29/407.9; 399/371

(56) References Cited

U.S. PATENT DOCUMENTS

| | | | | | |
|---|---|---|---|---|---|
| 3,961,173 | A | * | 6/1976 | Perry et al. | |
| 4,154,231 | A | * | 5/1979 | Russell | |
| 4,573,057 | A | * | 2/1986 | Sutera et al. | |
| 5,909,290 | A | * | 6/1999 | Kajiwara | 399/371 |

* cited by examiner

*Primary Examiner*—Robert Raevis
(74) *Attorney, Agent, or Firm*—Perman & Green, LLP

(57) ABSTRACT

A multi-sensor alignment testing device for aligning or testing a sensor in a paper processing apparatus. The device comprises a housing, a power supply section, and a signal selector section connected to the housing. The signal selector section is connectable to a power supply section and the sensor. The indicator section is connected to the signal selector section and the sensor.

5 Claims, 8 Drawing Sheets

SENSOR ALIGNMENT FOR A DOCUMENT PROCESSING APPARATUS

This application is a divisional of application Ser. No. 09/450,490, filed Nov. 29, 1999, now U.S. Pat. No. 6,247, 347.

BACKGROUND OF THE INVENTION

1. Field of the Invention

The present invention relates to a document processing apparatus and, more particularly, to the alignment and test of sensors within the document processing apparatus.

2. Prior Art

Referring to FIG. 1, there is shown a perspective view of a document processing apparatus 10. The apparatus 10 could be any suitable type of document processing apparatus, such as a copier, a facsimile machine, a scanner, a computer printer, or a multifunction device having two or more functions. Referring also to FIG. 2, in this embodiment the apparatus 10 is a copier which includes an original document feed system 11 and a copy document feed system 13. A scanner or image obtainer 12 is provided under a transparent glass platen 15. The scanned information from the scanner 12 of information on an original document fed through the original document feed system 11 is imaged onto paper selected from paper trays 14 or 16. Paper selected from either of the paper trays 14, 16 is moved by the copy document feed system 13 through the apparatus 10 by means of various belts 18 and rollers 19 schematically depicted in FIG. 2. The original document feed system 11 also comprises suitable belts and rollers. Throughout the paper paths of the two feed systems 11,13 there are mechanical sensors 30, 50 and optical sensors 20, 40 to indicate where and when a piece of paper is located. The sensors are initially aligned and tested during manufacture and re-aligned and tested as required by field service technicians throughout the life of the apparatus.

In the case of optical sensors 20, 40 the sensors are aligned so that when paper is present, light from a light emitting diode 20*a*, 40*a* encased within the sensor is blocked by the paper from the photosensitive transistor 20*b*, 40*b*, respectively, also encased within the sensor. Similarly, in the case of mechanical sensors, the sensors 30, 50 are aligned so that when paper is not present the switch 30*a*, 50*a*, respectively, is closed, thus, indicating the non presence of paper.

During manufacture the mechanical sensors may be aligned or tested using elaborate mechanical setups such as special mechanical jigs, or in the case of optical sensors, a cumbersome digital voltmeter and a power supply arrangement may be used. However, the slow response time of the digital voltmeter leads to a tedious and repetitive alignment process for each sensor being aligned. Moreover, the slow response time and unbuffered sensor signals can also lead to misaligned sensors requiring later apparatus disassembly if still in manufacture or alignment by a field service technician if the unit is in service.

Diagnostic programs within the document processing apparatus exist for assisting a field service technician in aligning and testing a sensor but require that the technician be able to see the apparatus screen or display 8 (see FIG. 1). However, many of the sensors are located such that the technician cannot see the display 8 while aligning or testing a particular sensor. Thus, attempting to align or test a sensor by use of the display 8 is awkward and time consuming.

SUMMARY OF THE INVENTION

A multi-sensor alignment-testing device for aligning or testing a mechanical or optical sensor in a paper processing apparatus. The testing device may be co-located within the paper processing apparatus housing or self contained within a hand held housing. The testing device comprises a power supply section; a sensor type selector switch, an indicator section, and contacts that are removably connectable to the optical sensor or mechanical switch under test. In the preferred hand held embodiment of the invention the housing can contain a standard 9 v transistor battery or means, such as a jack, for power from an external source. The indicator section signals or alerts the user when the sensor is properly aligned or is blocked or unblocked. In the preferred embodiment the indicator section is comprised of diodes where at least one diode is designated as the red diode and at least one diode is designated as the green diode. Red indicating a misaligned sensor or that the sensor is blocked or paper is present. The green LED indicates an aligned sensor or that the sensor is unblocked or no paper is present. In an alternate embodiment the indicator section may also include a sound device, such as a speaker, where the speaker sound may be proportional to the degree of alignment.

A method for aligning sensors in a paper processing apparatus using a powered alignment indicating device. The method comprising the steps of connecting the powered alignment indicating device to a sensor; selecting a sensor setting on the alignment indicating device; and adjusting the sensor until the device indicates that the sensor is properly aligned.

A method for testing sensors in a paper processing apparatus using the powered alignment indicating device. The method comprising the steps of connecting the powered alignment indicating device to a sensor; selecting a sensor setting on the alignment indicating device; placing a sheet of paper (or other optically solid item) between the photosensitive transistor and a light emitting diode; moving the paper such that the light from the LED to the photosensitive transistor is interrupted or not interrupted causing the RED and GREEN LEDs to switch on and off respectively.

BRIEF DESCRIPTION OF THE DRAWINGS

The foregoing aspects and other features of the present invention are explained in the following description, taken in connection with the accompanying drawings, wherein:

FIGS. 5A–5D are circuit diagrams of different types of sensors which the device shown in FIG. 3 may be connected to;

DETAILED DESCRIPTION OF THE PREFERRED EMBODIMENT

Figure 1:
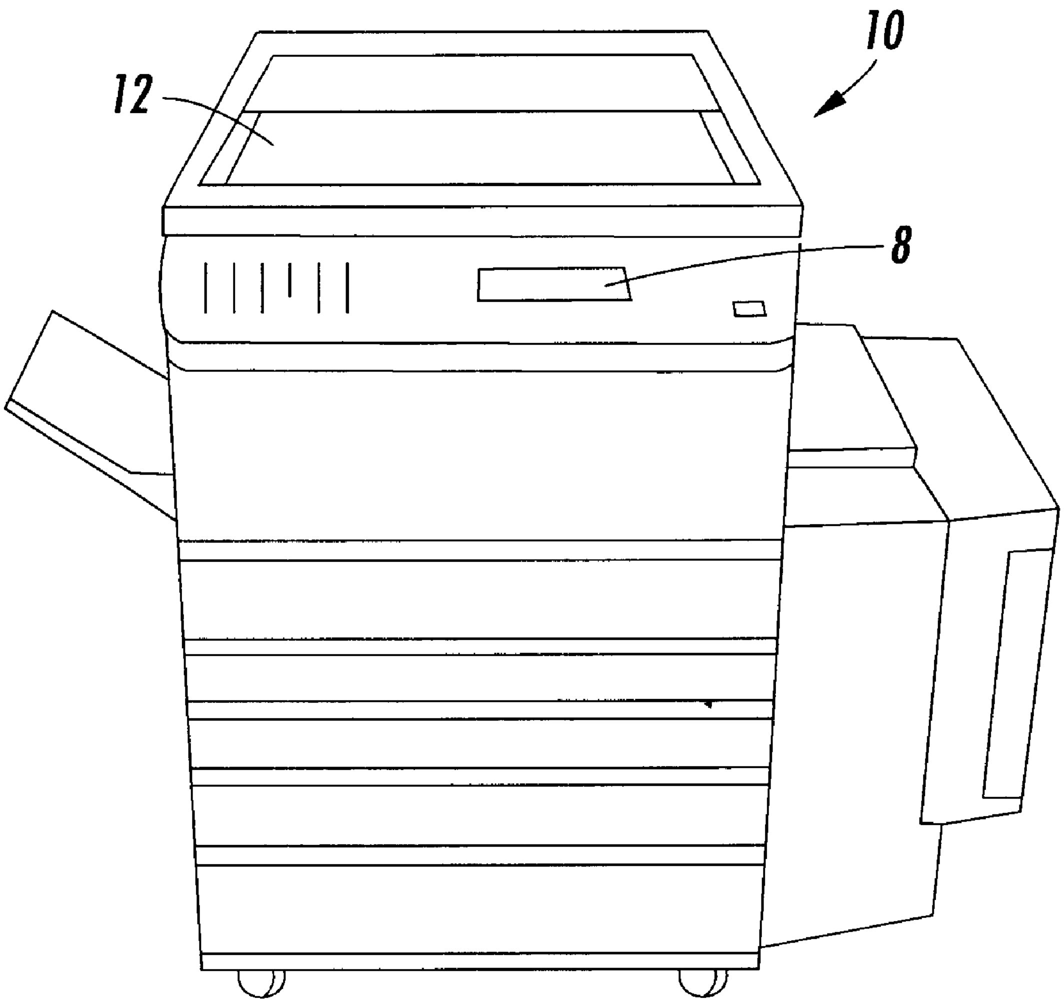
FIG. 1 PRIOR ART
FIG. 1 is a perspective view of a conventional document processing apparatus.

Although the present invention will be described with reference to the embodiments shown in the drawings, it should be understood that the present invention can be embodied in many alternate forms of embodiments.

Figure 2:
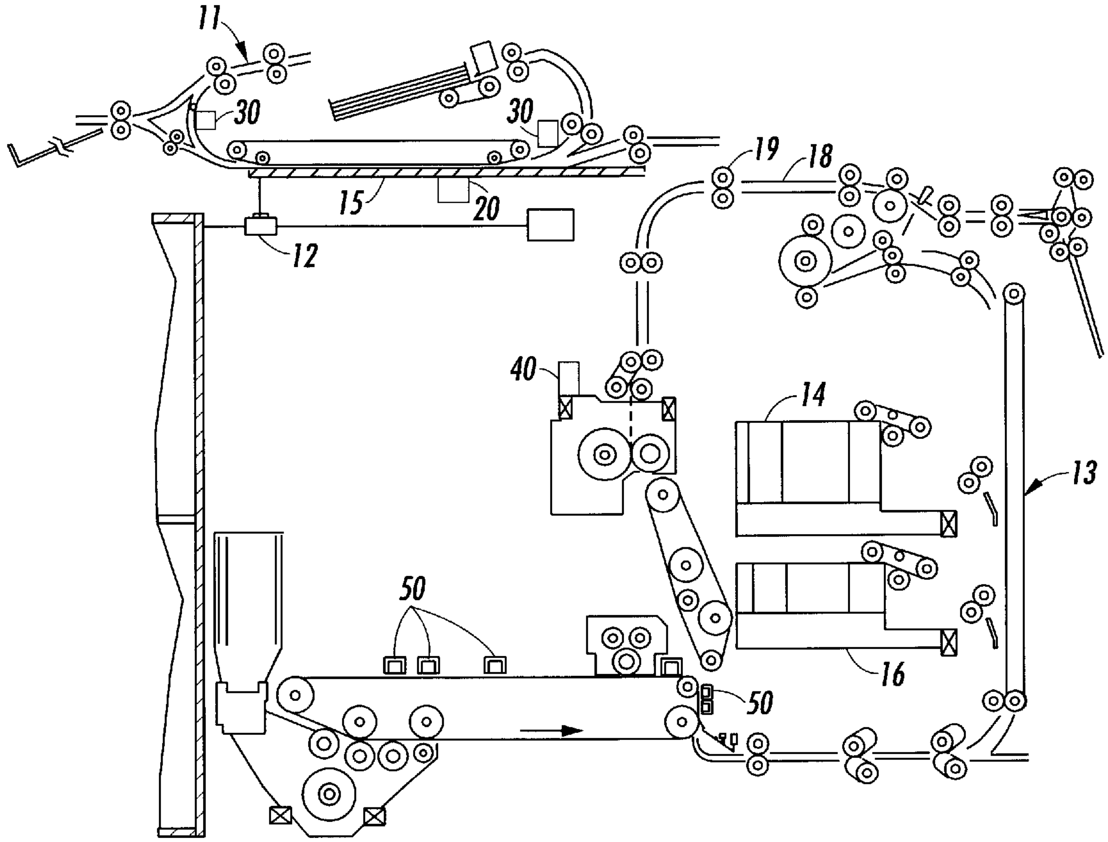
FIG. 2 PRIOR ART
FIG. 2 is a schematic view of paper paths within the paper processing apparatus shown in FIG. 1.
Figure 3:
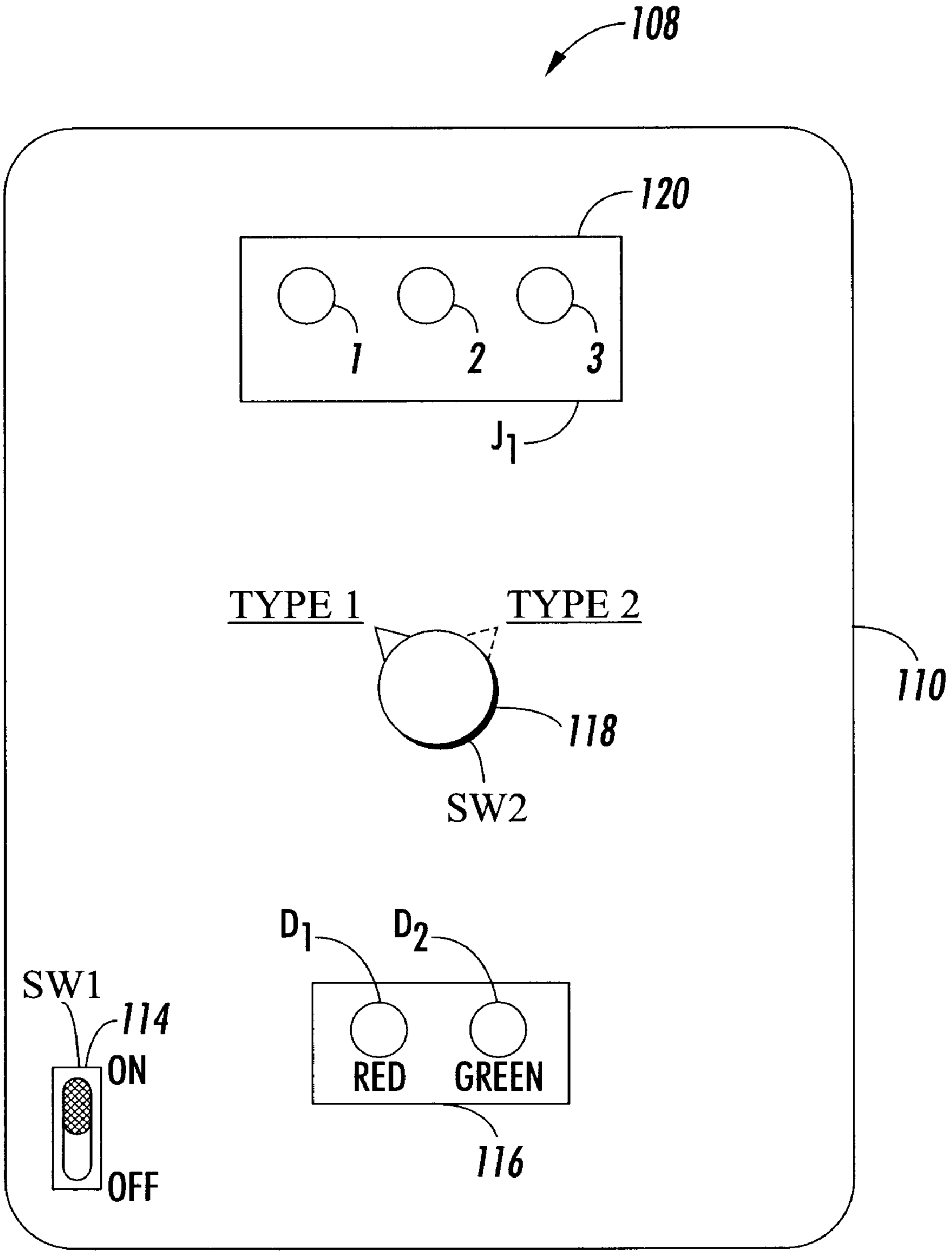
FIG. 3 is a front elevational view of a hand-held multi-sensor alignment testing device incorporating features of the present invention.
Figure 4:
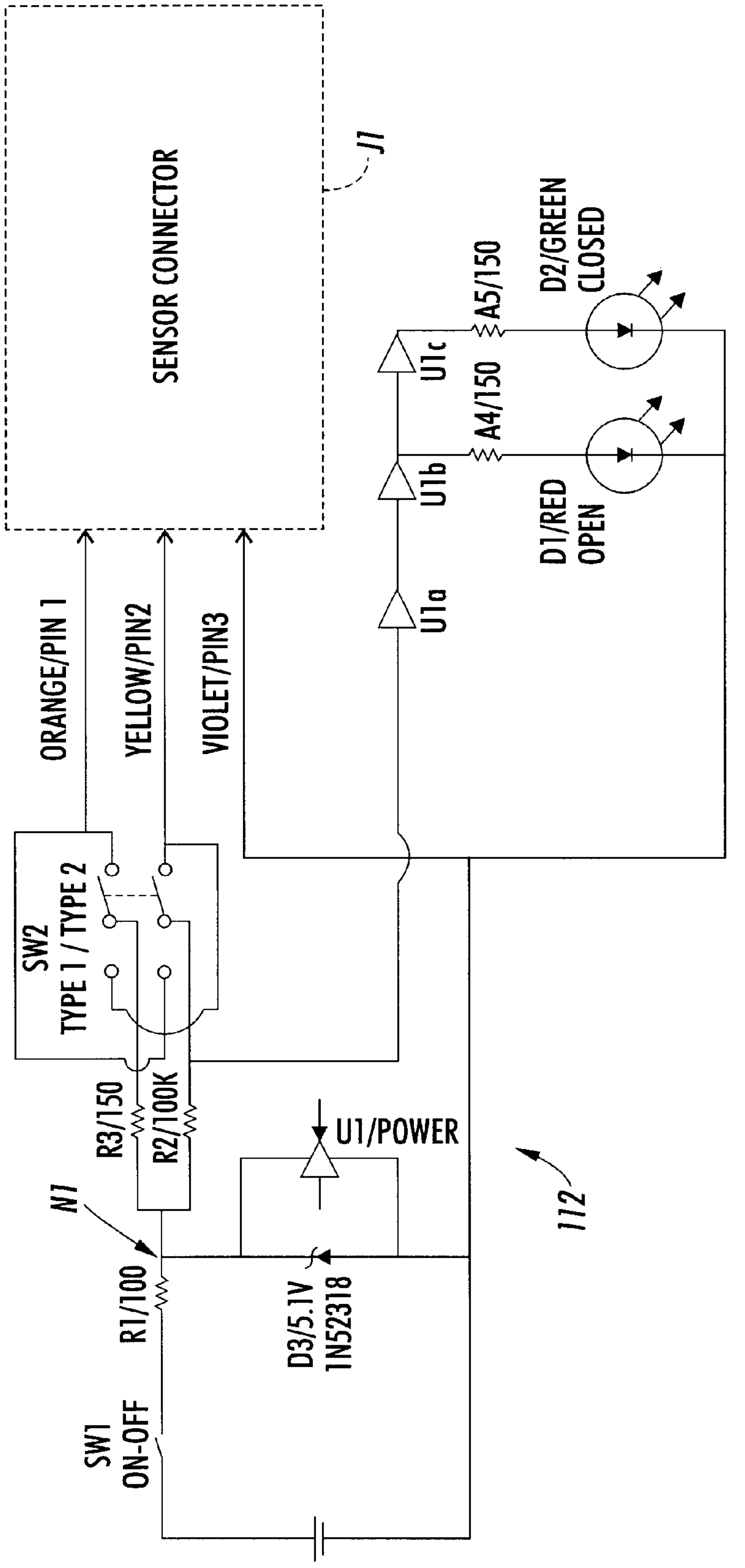
FIG. 4 is a circuit diagram of circuitry inside the device shown in FIG. 3.

Referring now to FIGS. 3 and 4 there is shown one embodiment of an alignment and testing device 108 incorporating features of the present invention. The device 108 is generally intended to be used for aligning or testing optical sensors and mechanical sensors in a document processing apparatus such as described above with reference to FIGS. 1 and 2 (e.g.: a copier, a facsimile machine, a computer printer, a scanner, or a multifunction device). As seen in FIG. 3 the device 108 generally comprises a housing 110, circuitry 112 (see FIG. 4) located in the housing , a power switch 114, an indicator section 116, a selector section 118, and a connector section 120.

The housing 110 generally comprises a housing suitable to enclose the circuitry described in FIG. 4 and fit easily within a user's hand. Alternatively, the housing may be a work bench testing station or the housing of the document processing apparatus.

The indication section 116 generally comprises at least two light emitting diodes (LEDs) connected to the connector section and the power switch. One of the diodes is designated as the red diode while the other is designated as the green diode; red signifying non-alignment or that paper is present or the sensor is blocked. The green diode signifies alignment or that no paper is present or that the sensor is unblocked. An alternative arrangement could comprise simply one diode where the off state signals the desired condition or alternatively the on state signals the desired condition. Other alternative arrangements could include an audio device in addition to the LEDs or in place of the LEDs or any suitable type of sensory stimulation device.

The selector section 118, connected to the power switch 114 and the connector section 120 comprises a double pole double throw switch for distributing power and signals to and from the connector section 120. Any suitable method could be used to select the type of sensor to be aligned or tested and distribute the appropriate power and signals to and from the appropriate pin in connector section 120. Methods such as jump wires, dual in-line package (DIP) switches, or remotely controlled relays could be suitable selector switches.

The connector section 120 generally comprises a three pin connector suitable to be mated with the connector on the sensor to be aligned or tested.

The power switch 114 generally comprises a single pole single throw slider switch connected to the selector switch and a nine volt power supply. Any suitable single pole single throw switch could be suitable as the power switch, including push button switches, rotary switches, or relay switches. Alternatively the power switch can be connected to any suitable power supply connector such as a jack for connection to an off-board power supply.

Referring also to FIG. 4, one embodiment of the circuitry 112 is shown. In this embodiment the circuitry 112 generally comprises a power supply section, a switching network section, an indicator section, and a connector J1.

The power supply stage comprises a 9 volt power supply 9v, a power supply switch SW1, a zener diode D3, voltage and current limit resistor R1 and current limiting resistors R1–R3. Power supply 9v can be any DC power supply source suitable for powering indicators and logic circuits and may be a board mounted power supply, such as a transistor battery, or externally provided to power supply switch SW1. As noted above, SW1 could be any suitable power switch used to connect power from the power supply to the current limiting resistor R1 as shown in FIG. 4. Zener diode D3 generally comprises a 5.1v zener diode designed to clamp the juncture at node 1 N1 to a nominal 5 volts DC. Alternatively, any suitable voltage clamping circuit or device could be used to clamp or provide the required circuit voltage at node N1. For example zener diode D3 could be replaced by a resistive voltage divider network.

The switching network section is comprised of double pole double throw switch SW2 and is described above.

The indicator sections comprises inverter IC U1, indicator diodes D1 and D2, and current limiting resistors R4–R5. Any suitable logic circuit combined with a sensory stimulation device or devices could be used. For example, an alternative arrangement could be to eliminate either diode D1 or D2. The off state of the remaining diode could signify the opposite condition. For example, if diode D1 were removed, then the off state of diode D2 would signify an aligned sensor or that paper is present or that the sensor is blocked.

Connector J1 is generally comprised of a three pin connector suitable to be connected with either an optical sensor 20, 40 or a mechanical sensor 30, 50.

Figure 5A:
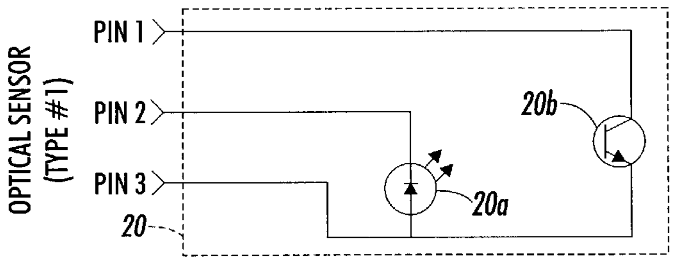
Figure 5B:
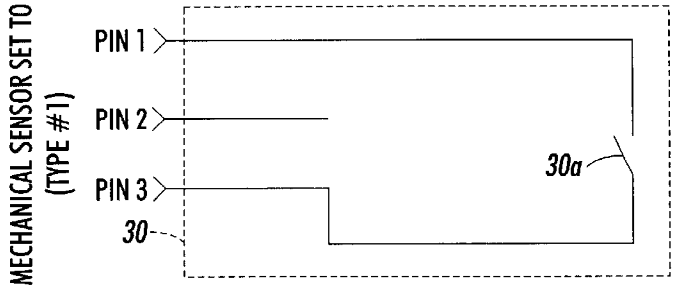
Figure 5C:
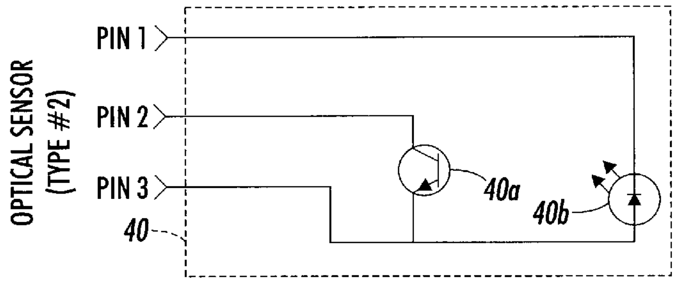
Figure 5D:
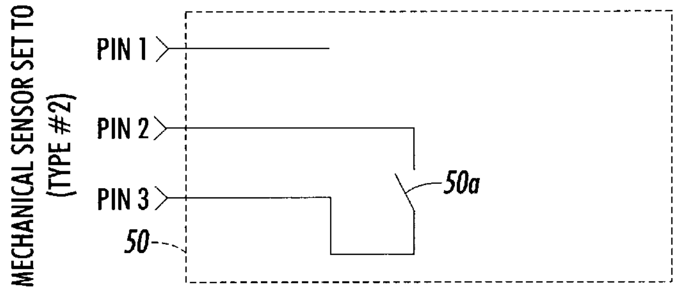

Operation of the circuit will be illustrated using optical sensor 20 shown in FIG. 5A. Referring now to FIGS. 3–5, and 7. The device 108 is connected to the optical sensor 20 via connector J1 62. Switch SW 1 on the device 108 is moved to the on position providing nine volts from the battery 9v. Zener diode D3 clamps the voltage at 5.1 volts at the juncture, node N1, of resistors R1 and R3,R2 providing a nominal 5 volts to signal selector switch SW2. (In addition 5 volts is also provided as circuit power to integrated circuit U1 comprising U1*a*,U1*b*, and U1*c*.) Setting 64 SW2 to the Type 1 position for a type 1 optical sensor 20 as shown in FIG. 5A, a 2.5 volt potential is developed at pin 2 of J1 through current limiting resistor R3 when connected to the optical sensor. The 5 volt potential is also developed at pin 1 of J1 through resistor R2. Pin 3 of J1 is connected to the return or common side of the power supply and serves as the return or common line for sensors shown in FIGS. 5A–5D.

Looking now at the optical sensor 20 in FIG. 5A with the voltages on pins 1–3 as described above the sensor 20 operates as follows. The 2.5 volt potential on pin 2 of the sensor causes encased light emitting diode (LED) 20*a* to emit light. The user then positions the sensor 64 so that light from LED 20*a* is reflected onto the base of encased phototransistor 20*b*. If the sensor 20 is positioned so that light from the LED 20*a* is not sufficiently reflected onto the base of phototransistor 20*b* the phototransistor 20*b* in the off state. With the phototransistor 20*b* in the off state the 5 volts on pin 1 of J1 is also on the input of inverter U1*a* shown in FIG. 4. Inverter U1*a* buffers and inverts the 5 volts so that the input to inverter U1*b* is 0 volts. Inverter U1*b* inverts the 0 volts so that the output of inverter U1*b* is 5 volts, forward biasing the LED D1, designated in FIG. 4 as the red diode, indicating 68 a misaligned sensor or that the paper is present or the sensor is otherwise blocked. The user continues to adjust the sensor 66 until the light from the photodiode 20*a* forward biases the phototransistor 20*b*. In the forward biased or on state pin 1 is effectively shorted to pin 3 through the phototransistor. The output of U1*b* is then a low, turning off LED D1 while the output of U1*c* is high, turning on diode D2, designated as the green diode indicating the sensor is aligned or that no paper is present or that the sensor is otherwise unblocked. Thus the user has immediate feedback that the sensor is properly aligned 70 and the user may disconnect the device 72. By comparison, other methods, require that the user wait until the voltmeter readout has stabilized before knowing whether or not the sensor is aligned; or, alternatively, have available and be able to see a display of diagnostic routines capable of indicating sensor alignment. The current invention however, allows the user to see immediately whether or not the sensor has been aligned and does not require the availability of diagnostic routines. Also, the use of the 74LS04 Shockley device U1 buffers the indicating section so that both LEDs do not turn on simultaneously when the phototransistor 20*b* within the sensor under test is only partially illuminated by the LED 20*a* within the sensor under test.

Figure 6:
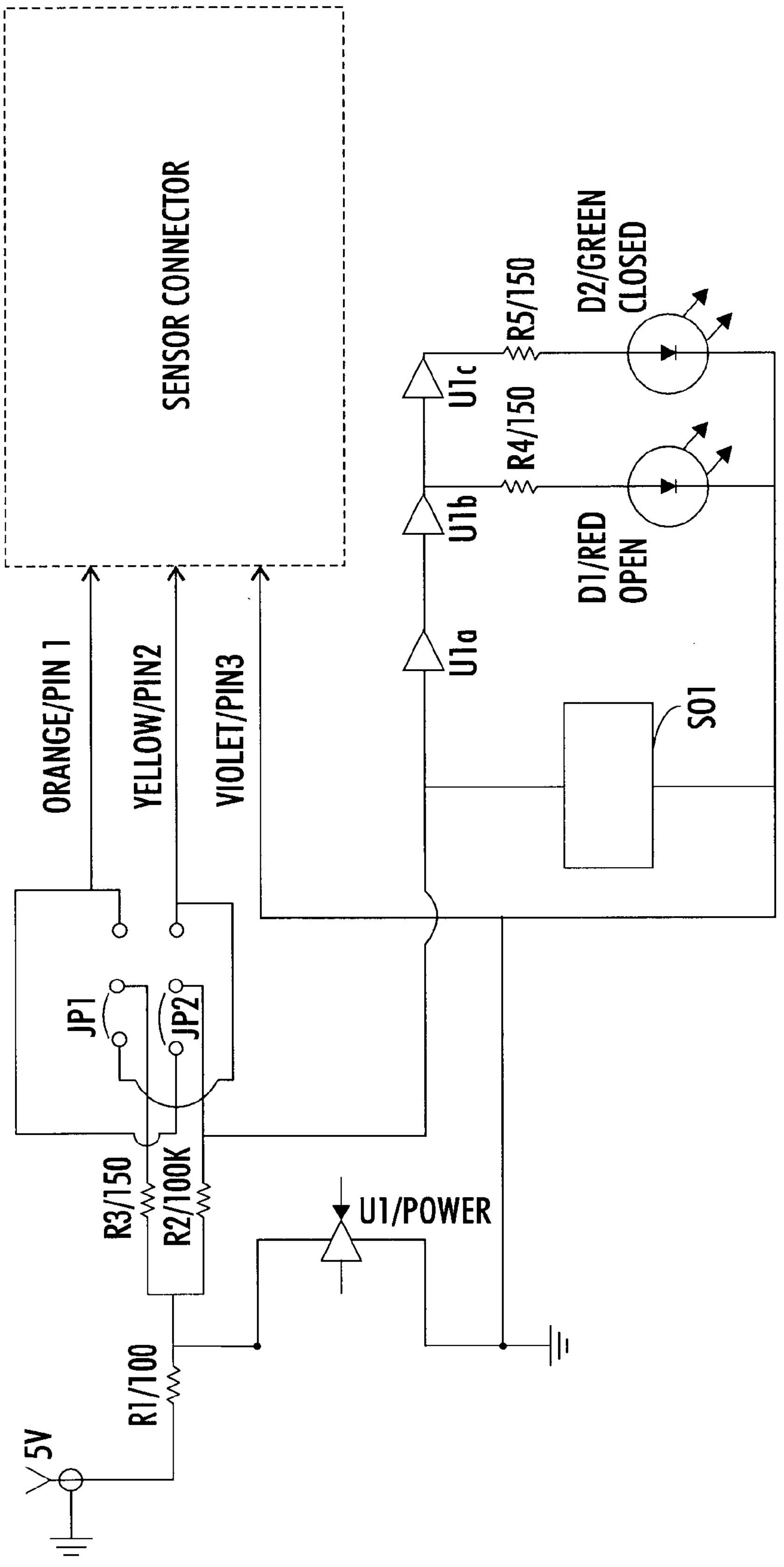
FIG. 6 is a circuit diagram of an alternate embodiment of the invention.
Figure 7:
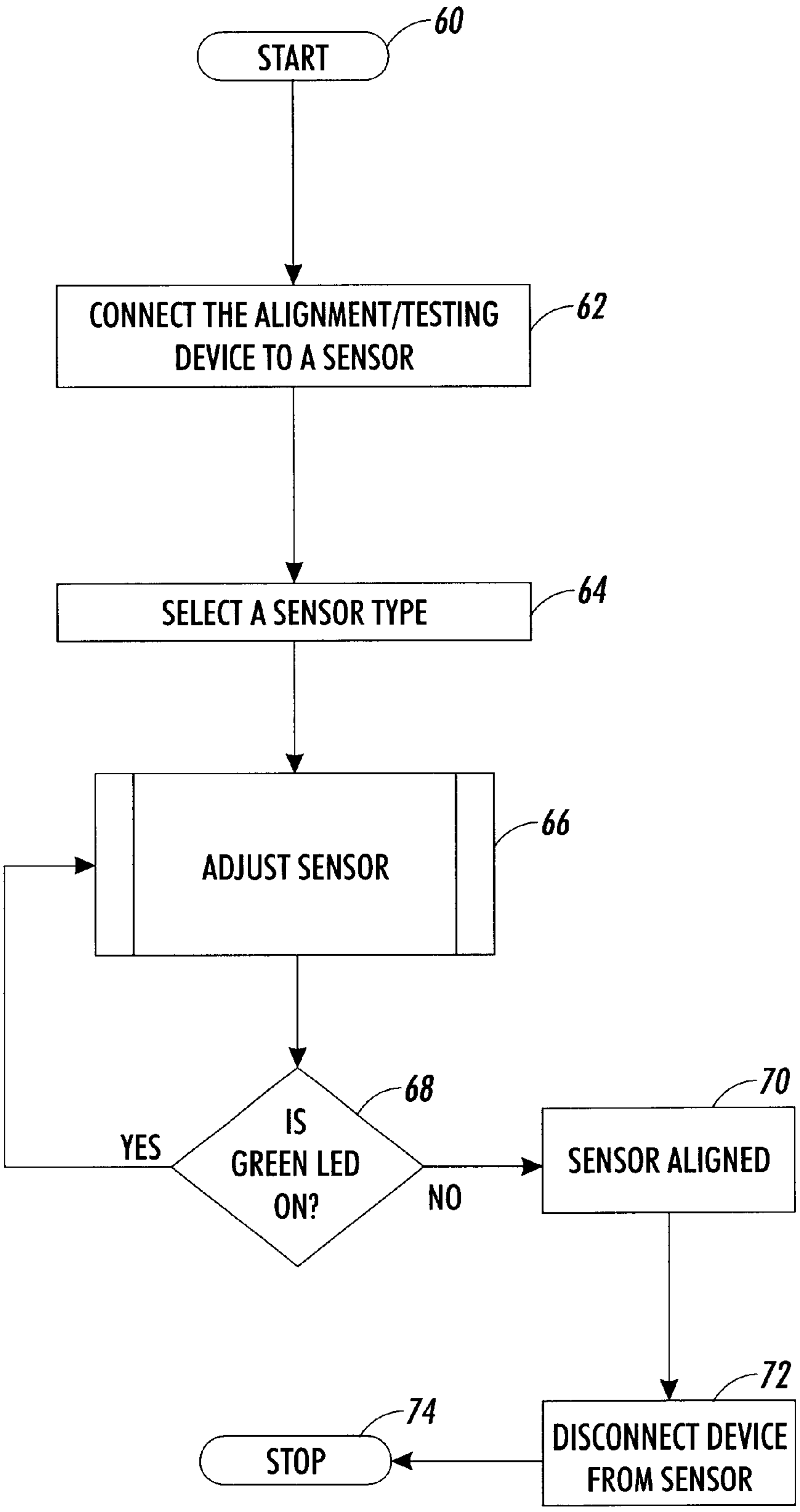
FIG. 7 is a flowchart of one method for aligning a sensor using device shown in FIG. 3.
Figure 8:
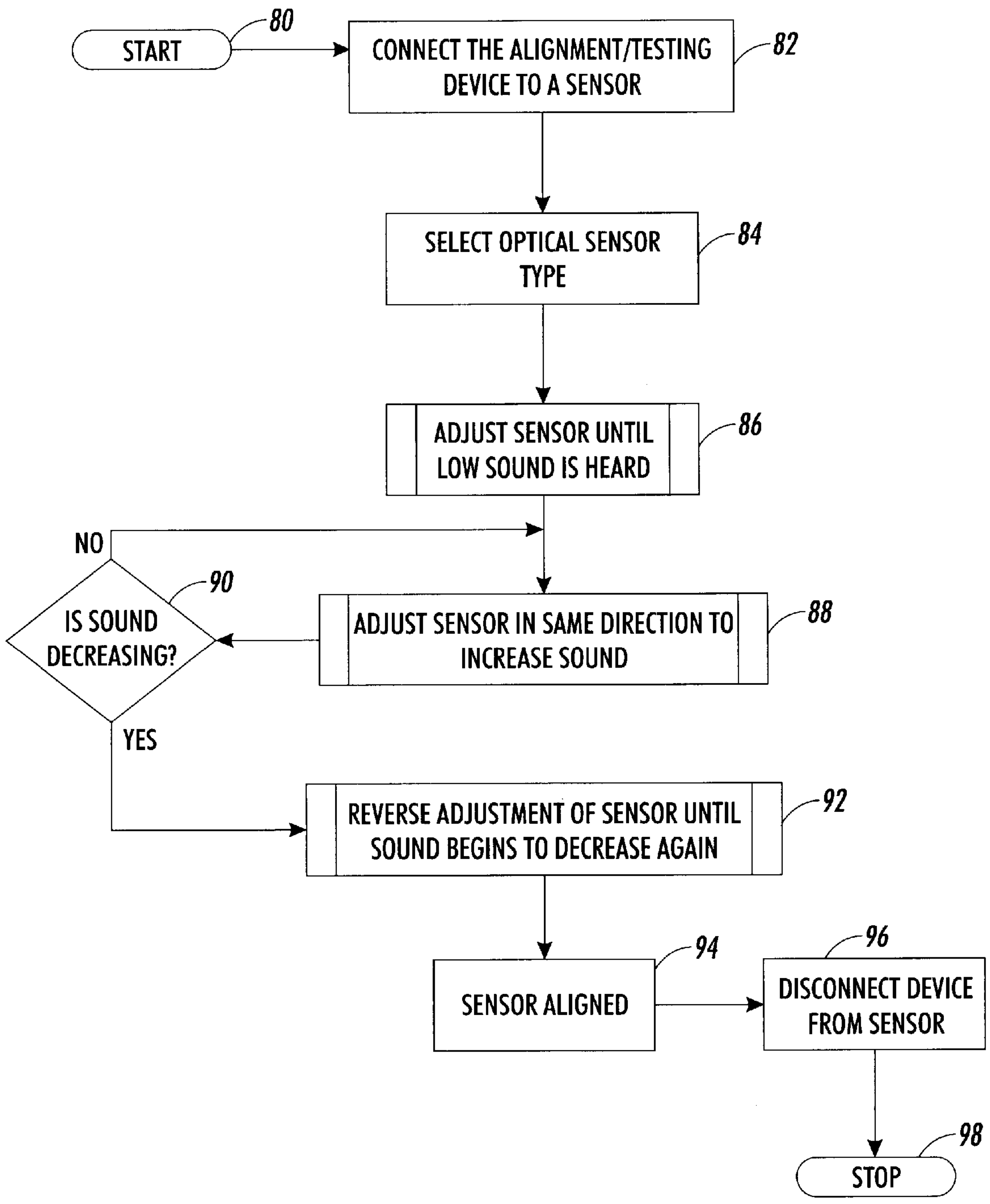
FIG. 8 is a flowchart of another method for aligning an optical sensor using an alternate embodiment of the invention.

In an alternative embodiment, as shown in FIG. 6 and FIG. 8, the user may use a sound indication device either in place of or in conjunction with the LEDs. In this configuration the user proceeds as described above, i.e., connect the alignment device to a sensor 82 and select the sensor type 84. Now however, the user adjusts 86 the sensor until a sound is emitted by sound device SD1 shown in FIG. 8. When the sound has reached its maximum (indicated by the sound inflection point determined by steps 88–92) the user knows that the sensor is aligned properly 94 and may disconnect the device from the sensor. This embodiment provides the advantage that the user not have to see the LEDs but can keep focused on aligning the sensor. In addition to providing immediate feedback when the sensor is aligned this embodiment provides the extra advantage of immediate feedback of the degree of sensor alignment, thus guiding the user in aligning the sensor. For example, the user merely has to adjust the sensor until a sound is heard. Then as indicated in FIG. 8, adjust the sensor until the sound inflection point is heard indicating that sensor 20 is positioned so that light from LED 20*a* is fully, or as much as possible under the conditions, illuminating phototransistor 20*b*.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A multi-sensor alignment testing device for aligning a sensor in a paper processing apparatus comprising:

a housing;

a power supply section;

a signal selector section connected to the housing, the signal selector section being connectable to the power supply section and the sensor; and an indicator section connected to the housing, the indicator section being connectable to the power supply section and the sensor, wherein the signal selector section comprises a double throw double pole switch.

2. A multi-sensor alignment testing device as in claim 1 wherein the power supply section comprises a nominal 5 volts DC power supply.

3. A multi-sensor alignment and testing device as in claim 1 wherein the indicator section comprises:

a control circuit; and at least one sensory stimulation device connected to the control circuit.

4. A multi-sensor alignment and testing device as in claim 3 wherein the at least one sensory stimulation device is an audible device.

5. A multi-sensor alignment and testing device as in claim 3 wherein the at least one sensory stimulation device comprises at least two light emitting diodes (LEDs).

* * * * *